(12) United States Patent
Dupont et al.

(10) Patent No.: US 10,191,347 B2
(45) Date of Patent: Jan. 29, 2019

(54) CHOLESTERIC LIQUID CRYSTAL CELL WITH INCREASED REFLECTIVITY

(71) Applicants: NEXTER SYSTEMS, Roanne (FR); INSTITUT MINES TELECOM-IMT ATLANTIQUE-BRETAGNE-PAYS DE LA LOIRE, Brest (FR)

(72) Inventors: Laurent Dupont, Bourges (FR); Suman Manna, Bourges (FR)

(73) Assignees: NEXTER SYSTEMS, Roanne (FR); INSTITUT MINES TELECOM—TELECOM BRETAGNE, Brest (FR)

( * ) Notice: Subject to any disclaimer, the term of this patent is extended or adjusted under 35 U.S.C. 154(b) by 0 days.

(21) Appl. No.: 15/526,046

(22) PCT Filed: Oct. 28, 2015

(86) PCT No.: PCT/FR2015/052913
§ 371 (c)(1),
(2) Date: May 11, 2017

(87) PCT Pub. No.: WO2016/075386
PCT Pub. Date: May 19, 2016

(65) Prior Publication Data
US 2017/0315398 A1    Nov. 2, 2017

(30) Foreign Application Priority Data

Nov. 12, 2014 (FR) ..................................... 14 02587

(51) Int. Cl.
*G02F 1/1335* (2006.01)
*G02F 1/137* (2006.01)
(Continued)

(52) U.S. Cl.
CPC .......... *G02F 1/13718* (2013.01); *C09K 19/36* (2013.01); *C09K 19/38* (2013.01);
(Continued)

(58) Field of Classification Search
CPC .......................................... G02F 2001/133565
See application file for complete search history.

(56) References Cited

U.S. PATENT DOCUMENTS

| 4,795,248 A * | 1/1989 | Okada ...................... G02B 3/14 349/13 |
| 2003/0067574 A1 | 4/2003 | Sasaki et al. |

(Continued)

FOREIGN PATENT DOCUMENTS

| WO | 98/43129 A1 | 10/1998 |
| WO | 2012/051127 A2 | 4/2012 |
| WO | 2013/110564 A1 | 8/2013 |

OTHER PUBLICATIONS

Jul. 13, 2015 Search Report and Written Opinion issued in French Patent Application No. 1402587.
(Continued)

*Primary Examiner* — Kendrick Hsu
(74) *Attorney, Agent, or Firm* — Oliff PLC

(57) ABSTRACT

The invention relates to a reflecting cell including at least two substrates covered by an electrode and facing each other, the substrates delimiting between them a volume which separates them and which is filled with a cholesteric liquid crystal-type material, both electrodes being intended to be connected to a voltage source. This cell includes at least one half-wave plate arranged between both substrates and dividing the volume into two compartments, each enclosing a part of a same cholesteric liquid crystal.

4 Claims, 1 Drawing Sheet

Figure 1:
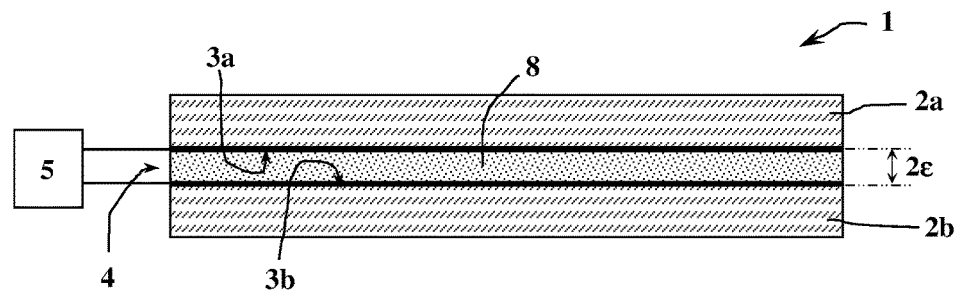

(51) Int. Cl.
- *C09K 19/38* (2006.01)
- *G02F 1/13363* (2006.01)
- *G02F 1/1347* (2006.01)
- *C09K 19/36* (2006.01)
- *C09K 19/52* (2006.01)
- *G02F 1/1343* (2006.01)

(52) U.S. Cl.
CPC ............ *C09K 19/52* (2013.01); *G02F 1/1347* (2013.01); *G02F 1/13363* (2013.01); *G02F 1/13439* (2013.01); *C09K 2019/521* (2013.01); *G02F 2001/13478* (2013.01); *G02F 2001/133565* (2013.01); *G02F 2001/133638* (2013.01); *G02F 2203/02* (2013.01); *G02F 2413/01* (2013.01); *G02F 2413/05* (2013.01)

(56) References Cited

U.S. PATENT DOCUMENTS

| | | |
|---|---|---|
| 2005/0151896 A1 | 7/2005 | Hara et al. |
| 2010/0103337 A1 | 4/2010 | Takaku |
| 2010/0225853 A1 | 9/2010 | Wang et al. |
| 2011/0019111 A1 | 1/2011 | Morikawa et al. |
| 2011/0174977 A1 | 7/2011 | Hikmet et al. |
| 2012/0257141 A1 | 10/2012 | Peng et al. |
| 2014/0192280 A1* | 7/2014 | He .................... H04N 13/0434 349/13 |

OTHER PUBLICATIONS

Feb. 9, 2016 International Search Report issued in International Patent Application No. PCT/FR2015/052913.

Jan. 15, 2018 Written Opinion issued in Patent Application No. 11201703606W.

\* cited by examiner

CHOLESTERIC LIQUID CRYSTAL CELL WITH INCREASED REFLECTIVITY

The technical field of the invention is that of reflecting cells implementing the cholesteric liquid crystals.

Such cells are known, for example, by patent WO2012/051127. The cholesteric liquid crystals have the particularity of reflecting the light incident on a part of the visible spectrum which is determined by the type of chiral dopant material associated with the liquid crystal. The other part of the spectrum is transmitted.

When these crystals are subjected to an electrical field of a certain level, they change their state and then become entirely transparent.

Due to their transparency, the cholesteric liquid crystal cells can thus be stacked above each other in order to constitute polychrome cells allowing to reflect a color which is a combination of at least two elementary colors.

Such a structure is described by patent WO98/43129 which also contemplates an operation in the infrared domain.

It is thus known to make cholesteric color screens comprising an assembly of elementary pixels which each comprise a stack of three cholesteric cells, each corresponding to a primary color (Red, Green or Blue). Each cell of each elementary pixel is electronically and individually controllable to control the reflection or transparency of said cell. The pixels are attached to an absorbing black background allowing to prevent the return of light which was not filtered by a cell of the pixel.

Conventionally, the control or addressing of the cells of each pixel is performed through active matrix, passive matrix or alpha-numeric direct addressing.

One of the disadvantages of the cholesteric liquid crystal cells is that, for the conventional liquid crystals, only 50% of the environmental light is reflected.

This is the case for the cholesteric liquid crystals implementing an homogeneous material and having a given (right or left) helicity. Indeed, such property results from the helicity of the material which reflects only the light polarized in the same direction as the helicity, thereby limiting the proportion reflected at 50% of the received natural light.

Materials associating several types of helicity exist, but these materials are more complex to implement and more expensive.

It is also known, by patent US2011/019111, a cholesteric liquid crystal display, which display allows to control the grey level of the cell considered. This display has an intermediary layer which has a dielectric constant different (lower or greater) from that of the liquid crystal. The intermediary layer allows to create areas within the liquid crystal, in which the electrical field is stronger for a given voltage. Such an arrangement allows to modulate the reflectivity of the cell between different grey levels. However, it does not allow to increase the reflectivity of the cell.

The invention is intended to provide a cholesteric liquid crystal cell which allows to reflect substantially 100% of the light received.

This cell has a simple structure and a reduced cost.

The invention is further intended to provide such a cell, which reflects 100% of the light received and has a reduced volume.

Thus, the invention relates to a reflecting cell comprising at least two substrates, each covered by an electrode and facing each other, the substrates delimiting between them a volume which separates them and which is filled with a cholesteric liquid crystal-type material, both electrodes being intended to be connected to a voltage source, the cell being characterized in that it comprises at least one half-wave plate arranged between both substrates and dividing the volume into two compartments, each enclosing a part of a same cholesteric liquid crystal.

According to an embodiment, the half-wave plate could be constituted by a film made of a polymeric material.

In particular, the half-wave plate could be made of poly-ethylene (PE) or poly(ethylene terephthalate) (PET).

According to a particular embodiment, the half-wave plate could be covered on each of its faces by a deposit of an optically transparent and conducting material, the deposits being intended to be connected to the voltage source, such that an electrical field can be set between each substrate and the half-wave plate.

The deposit of the conducting material could be constituted by a deposit of ITO or PEDOT-PSS.

The invention will be better understood upon reading the following description of different embodiments, the description being made in reference to the appended drawings in which:

FIG. 1 schematically shows a cholesteric cell according to the prior art.

Figure 2:
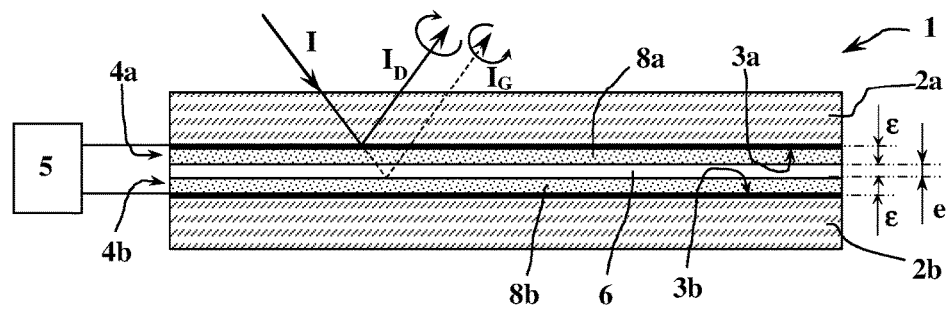

FIG. 2 schematically shows a cholesteric cell according to a first embodiment of the invention.

Figure 3:
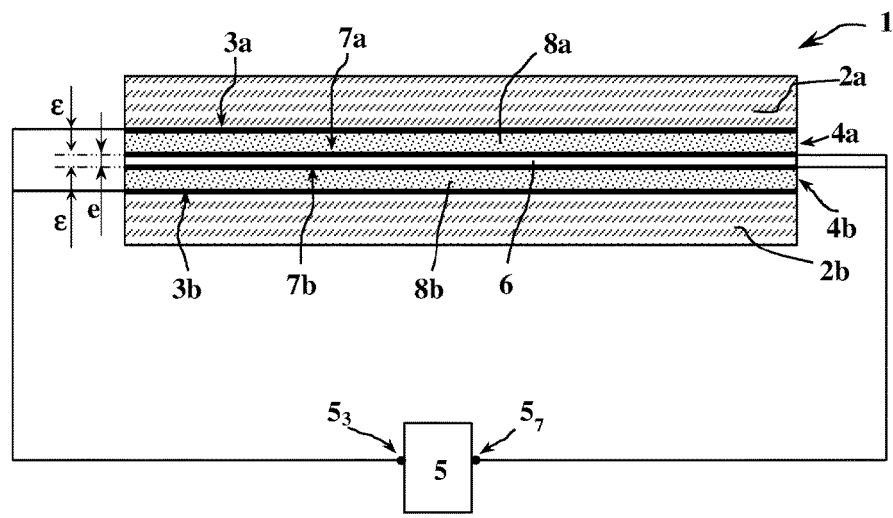

FIG. 3 schematically shows a cholesteric cell according to a second embodiment of the invention.

FIG. 1 shows a cholesteric cell 1 according to the prior art. This cell has two substrates 2a and 2b which are each covered, on one of their faces, by an electrode 3a or 3b.

The substrates can be glass plates and each electrode can be constituted by a transparent conducting deposit applied on the considered glass plate.

The transparent conducting deposits 3a, 3b will be, for example, constituted by deposits associating indium oxide ($In_2O_3$) and tin oxide ($SnO_2$). Such a material is commonly designated by the acronym ITO (Indium Tin Oxide).

The substrates 2a and 2b delimit a volume 4 in which is arranged a cholesteric liquid crystal 8 which is thus interposed between both substrates 2a and 2b.

Both electrodes 3a and 3b are connected to a voltage source 5, such as an electrical generator, which applies a voltage U between the electrodes 3a and 3b, thereby producing an electrical field E between both substrates 2a and 2b, thus between the two surfaces delimiting the liquid crystal 8.

Conventionally, the cholesteric liquid crystal 8 is a material comprising a helical macroscopic structure with a period P in the absence of an electrical field applied (designated as planar state of the crystal). This material has a nematic phase associated with a chiral dopant allowing to adjust the pitch P of the helix. The wavelength which is reflected by the liquid crystal 8 depends on the pitch P, thus on the chiral dopant used.

The cholesteric liquid crystal assumes, in its idle state, its planar state in which it reflects the light having the wavelength associated with its pitch P ($\lambda = n \cdot P$, expression in which $\lambda$ is the reflected wavelength, n is the mean index of the material, and P is the pitch of the helix).

When the value of the electrical field E increases, the liquid crystal transitions from its planar state to a focal conic state in which the helical structures are partially switched (causing the reflectivity to be more reduced) and then to a homeotropic state in which the liquid crystal aligns with the electrical field E and the material is then transparent.

The planar and focal conic states are stable states in which the material remains in the absence of field. The homeotropic state (transparent) is an unstable state which requires the presence of the electrical field.

When the electrical field is turned-off, the material transitions from the homeotropic state to the planar state (maximum reflection coefficient).

$E_{TH}$ will indicate the value of the threshold field allowing to transition from the focal conic state to the homeotropic state.

Many documents describe the structures and compositions of the cholesteric liquid crystals and it is thus not necessary to provide more details here.

Reference could be made, for example, to patent WO2012051127 which describes several cholesteric liquid crystals and the associated chiral dopants for different visible wavelengths.

The right or left-handed helicity of the cholesteric material 8 causes the reflection (in the planar state) of the part of the light received which is polarized in the same direction (right or left-handed) as the crystal helicity. This polarization will obviously occur for the reflectivity wavelength associated with the liquid crystal.

Thus, with a conventional cholesteric crystal, the reflectivity cannot exceed 50%, thereby impairing the visibility of the reflected image.

FIG. 2 shows a first embodiment of the invention.

According to this embodiment, a half-wave plate 6 is arranged between both substrates 2a and 2b and divides the volume 4 delimited by theses substrates into two compartments 4a and 4b, each enclosing a part 8a,8b of the same cholesteric liquid crystal material (thus having the same helicity for each part 8a,8b).

The half-wave plate 6 is constituted by a film made of a polymeric material such as, for example, polyethylene (PE) or poly(ethylene terephthalate) (PET). This plate 6 has a thickness of about ten microns.

The presence of a half-wave plate 6 causes a right-handed circular polarization to be turned into a left-handed circular polarization, and vice versa.

Thus, with a right-handed helicity cholesteric crystal, the right-handed polarization part $I_D$ of the incident radiation I will be reflected by the part 8a of the liquid crystal.

The left-handed polarization part $I_G$ of this radiation will on the contrary pass through the part 8a without being reflected. It will pass through the half-wave plate 6 and be right-hand polarized at the output of this plate 6.

Thus, this part of the radiation can be reflected by the part 8b of the liquid crystal. It will pass again, after reflection, through the half-wave plate 6 which will left-hand polarize it again, thereby allowing it to pass through the part 8a of the liquid crystal.

Thus, the cell 1 will also reflect the part $I_G$ left-hand polarized of the incident radiation I.

The cell 1 according to the invention thus reflects 100% of the radiation received.

However, the presence of the half-wave plate 6 imposes on both electrodes 3a and 3b to be spread apart by the thickness e of the half-wave plate 6. The electrical voltage which is required to obtain the state changing electrical field $E_{TH}$ is thus higher.

The necessary voltage increase is proportional to the ratio of the thickness e of the half-wave plate 6 to the total thickness 2ε of the liquid crystal.

If considering a cell according to the prior art with a cholesteric liquid crystal having a thickness 2ε=40 micrometers, and if providing the cell according to the invention with two liquid crystal parts each having a thickness ε=20 micrometers and separated by a half-wave plate having a thickness e=10 micrometers, the distance separating the electrodes 3a,3b is equal to e+2ε=50 micrometers instead of 40 micrometers, which causes a necessary increase of the electrical voltage level by 25%.

This can be admissible for moderated-size displays.

FIG. 3 shows another embodiment of the invention, which allows to greatly reduce the required electrical voltage and thus to simplify the implementation of the addressing of the cells.

This embodiment differs from the previous one in that the half-wave plate 6 (which is still made in the form of a film made of a polymeric material) is now covered, on each of its faces, by a deposit 7a and 7b of a conducting and optically transparent material.

The transparent conducting material could be ITO (indium oxide/tin oxide) or PEDOT-PSS. PEDOT-PSS refers to a mixture of two polymers, poly(3,4-ethylenedioxythiophene) (or PEDOT) and sodium polystyrene sulfonate (or PSS).

Both conducting deposits 7a and 7b are both connected to an input $5_7$ of the voltage source 5.

Furthermore, both electrodes 3a and 3b are both connected to another input $5_3$ of the voltage source 5.

Thus, the voltage source 5 applies a potential difference Ua between the conducting deposit 7a and the electrode 3a and a potential difference Ub between the conducting deposit 7b and the electrode 3b.

The potential differences Ua and Ub are equal, since both electrodes 3a and 3b are connected to each other and both conducting deposits 7a and 7b are also connected to each other.

The thicknesses ε of the cholesteric liquid crystal parts 8a and 8b being further also equal, the voltage source 5 allows to apply electrical fields Ea and Eb which are equal between each substrate 2a,2b and the half-wave plate 6, thus at each cholesteric liquid crystal part 8a and 8b.

Thus, using this embodiment, the required voltage to obtain the state changing electrical field $E_{TH}$ is equal to Va=Vb=ε×$E_{TH}$ (ε being the thickness of a part 8a or 8b or the distance between the electrode 3a (respectively 3b) and the deposit 7a (respectively 7b)).

The thickness ε being half the initial thickness 2ε of the material 8 (FIG. 1), the required voltage is thus half that which was necessary according to the prior art.

Furthermore, the reflectivity is 100%, as in the previous embodiment.

This last embodiment is thus particularly well adapted to the reflective devices having large dimensions or required to consume little energy.

The invention claimed is:

1. A reflecting cell comprising at least two substrates each covered by an electrode and facing each other, a volume being delimited between the substrates, the volume separating the substrates and is the volume being filled with a cholesteric liquid crystal-type material, both electrodes being connected to a voltage source, wherein the cell comprises at least one half-wave plate arranged between both substrates and dividing the volume into two compartments, each enclosing a portion of the cholesteric liquid crystal-type material, and the reflecting cell has a 100% reflection coefficient during a planar state of the reflecting cell,
    wherein each face of the half-wave plate is covered by a deposit of an optically transparent and conducting material, each of the deposits being connected to the voltage source, such that an electrical field can be set between each substrate and the half-wave plate.

2. The reflecting cell according to claim 1, wherein the half-wave plate is constituted by a film made of a polymeric material.

3. The reflecting cell according to claim 2, wherein the half-wave plate is made of polyethylene (PE) or poly (ethylene terephthalate) (PET).

4. The reflecting cell according to claim 1, wherein the deposit of conducting material is constituted by a deposit of ITO or PEDOT-PSS.

* * * * *